US011862146B2

(12) United States Patent
Han et al.

(10) Patent No.: US 11,862,146 B2
(45) Date of Patent: Jan. 2, 2024

(54) MULTISTREAM ACOUSTIC MODELS WITH DILATIONS

(71) Applicant: ASAPP, INC., New York, NY (US)

(72) Inventors: Kyu Jeong Han, Pleasanton, CA (US); Tao Ma, Mountain View, CA (US); Daniel Povey, Redmond, WA (US)

(73) Assignee: ASAPP, INC., New York, NY (US)

( * ) Notice: Subject to any disclaimer, the term of this patent is extended or adjusted under 35 U.S.C. 154(b) by 369 days.

(21) Appl. No.: 16/920,081

(22) Filed: Jul. 2, 2020

(65) Prior Publication Data

US 2021/0005182 A1    Jan. 7, 2021

Related U.S. Application Data

(60) Provisional application No. 63/025,640, filed on May 15, 2020, provisional application No. 62/871,033, filed on Jul. 5, 2019.

(51) Int. Cl.
*G10L 25/24* (2013.01)
*G06N 3/045* (2023.01)
*G10L 15/16* (2006.01)
*G10L 15/22* (2006.01)
*G10L 15/06* (2013.01)
(Continued)

(52) U.S. Cl.
CPC .............. *G10L 15/16* (2013.01); *G06N 3/045* (2023.01); *G10L 25/24* (2013.01); *G06N 3/048* (2023.01); *G06N 3/08* (2013.01); *G10L 15/063* (2013.01); *G10L 2015/223* (2013.01)

(58) Field of Classification Search
CPC ... G10L 15/16; G10L 25/24; G10L 2015/223; G10L 15/063; G06N 3/0481; G06N 3/08; G06N 3/0454; G06N 3/045; G06N 3/048
USPC .......................................................... 704/232
See application file for complete search history.

(56) References Cited

U.S. PATENT DOCUMENTS 9,953,236 B1 * 4/2018 Huang .................... G06V 10/82
10,067,509 B1 * 9/2018 Wang ...................... G06V 10/82
10,147,193 B2 * 12/2018 Huang ...................... G06T 7/10
(Continued)

OTHER PUBLICATIONS

"A framework for practical multistream ASR", Interspeech, 2016, pp. 3474-3478.
(Continued)

*Primary Examiner* — Edwin S Leland, III
(74) *Attorney, Agent, or Firm* — GTC Law Group PC & Affiliates (57) ABSTRACT

Audio signals of speech may be processed using an acoustic model. An acoustic model may be implemented with multiple streams of processing where different streams perform processing using different dilation rates. For example, a first stream may process features of the audio signal with one or more convolutional neural network layers having a first dilation rate, and a second stream may process features of the audio signal with one or more convolutional neural network layers having a second dilation rate. Each stream may compute a stream vector, and the stream vectors may be combined to a vector of speech unit scores, where the vector of speech unit scores provides information about the acoustic content of the audio signal. The vector of speech unit scores may be used for any appropriate application of speech, such as automatic speech recognition.

20 Claims, 5 Drawing Sheets

(51) Int. Cl.
*G06N 3/08* (2023.01)
*G06N 3/048* (2023.01)

(56) References Cited

U.S. PATENT DOCUMENTS

| | | | | |
|---|---|---|---|---|
| 10,354,015 | B2* | 7/2019 | Kalchbrenner | G06N 3/045 |
| 10,679,074 | B2* | 6/2020 | Huang | G06V 10/82 |
| 10,733,390 | B2* | 8/2020 | Kalchbrenner | G06N 3/084 |
| 11,587,304 | B2* | 2/2023 | Wang | G06F 18/2137 |
| 2018/0075343 | A1* | 3/2018 | van den Oord | G06N 3/084 |
| 2018/0259970 | A1* | 9/2018 | Wang | G06N 3/045 |
| 2018/0260956 | A1* | 9/2018 | Huang | B60W 30/10 |
| 2018/0329897 | A1* | 11/2018 | Kalchbrenner | G06N 3/047 |
| 2019/0050667 | A1* | 2/2019 | Wang | G06T 7/12 |
| 2019/0108641 | A1* | 4/2019 | Huang | G06N 3/08 |
| 2019/0114391 | A1* | 4/2019 | Jaganathan | G16B 20/00 |
| 2019/0114511 | A1* | 4/2019 | Gao | G06N 3/0481 |
| 2019/0114544 | A1* | 4/2019 | Sundaram | G16H 70/60 |
| 2019/0114547 | A1* | 4/2019 | Jaganathan | G06N 3/0481 |
| 2019/0197401 | A1* | 6/2019 | Jaganathan | G06N 3/084 |
| 2019/0286708 | A1* | 9/2019 | Kalchbrenner | G06N 3/047 |
| 2019/0341052 | A1* | 11/2019 | Allibhai | G10L 25/90 |
| 2020/0051583 | A1* | 2/2020 | Wu | G06N 3/0445 |
| 2020/0065675 | A1* | 2/2020 | Sundaram | G16H 70/60 |
| 2020/0175313 | A1* | 6/2020 | Jang | G06V 10/82 |
| 2021/0005182 | A1* | 1/2021 | Han | G10L 15/16 |
| 2021/0374936 | A1* | 12/2021 | Koopman | G06T 7/11 |

OTHER PUBLICATIONS

"Coding and decoding of messages in human speech communication: Implications for machine recognition of speech", Speech Communication, vol. 106, 2019, pp. 112-117.
"Multi-resolution RASTA filtering for TANDEM-based ASR", ICSLP, 2005, pp. 361-364.
Allen, J., "How do humans process and recognize speech?", IEEE Trans. Audio, Speech and Lang. Process., vol. 2, No. 4, 1994, pp. 567-577.
Barker, J. et al., "The third 'CHIME' speech separation and recognition challenge: Analysis and outcome", Comp. Speech Lang., vol. 46, 2017, pp. 605-626.
Bourlard, H. et al., "A new ASR approach based on independent processing and recombination of partial frequency bands", ICSLP, 1996, pp. 426-429.
Bourlard, H. et al., "Connectionist speech recognition: A hybrid approach", The Springer International Series in Engineering and Computer Science, vol. 247, No. 1, 1994, 291 pages.
Bourlard, H. et al., "Subband-based speech recognition", ICASSP, 1997, pp. 1251-1254.
Bourlard, H. et al., "Towards subband-based speech recognition", EUSIPCO, 1996, pp. 1-4.
Carletta, J. et al., "The AMI meeting corpus: A preannouncement", Machine Learning for Multimodal Interaction, 2005, pp. 28-39.
Chan, William et al., "Listen, Attend and Spell: A neural network for large vocabulary conversational speech recognition", International Conference on Acoustics, Speech, and Signal Processing, 2016, pp. 4960-4964.
Chang, S.-Y. et al., "Robust CNN-based speech recognition with Gabor filter kernels", Interspeech, 2014, pp. 905-909.
Chiu, Chung-Cheng et al., "State-of-the-art speech recognition with sequence-to-sequence models", International Conference on Acoustics, Speech, and Signal Processing, 2018.
Chiu, Chung-Cheng et al., "State-of-the-Art Speech Recognition with Sequence-to-Sequence Models", 2018 IEEE International Conference on Acoustics, Speech and Signal Processing (ICASSP), 2018, pp. 4774-4778.
Dai, Zihang et al., "Transformer-XL: Attentive Language Models Beyond a Fixed-Length Context", arXiv:1901.02860v3 [cs.LG], https://arxiv.org/pdf/1901.02860.pdf, Jun. 2, 2019, 20 pages.
Dauphin, Y.N. et al., "Language modeling with gated convolutional networks,", ICML, 2017, pp. 931-941.
Devlin, Jacob et al., "BERT: Pre-training of deep bidirectional Transformers for language understanding", [Online]. Available: https://arxiv.org/abs/1810.04805, 2018.
Devlin, Jacob et al., "BERT: Pre-training of Deep Bidirectional Transformers for Language Understanding", CoRR arXiv:1810.04805v2 [cs.CL], https://arxiv.org/pdf/1810.04805.pdf (accessed on Mar. 21, 2020), May 24, 2019, 16 pages.
Dong, Linhao et al., "A no-recurrence sequence-to-sequence model for speech recognition", Speech-Transformer, 2018, pp. 5884-5888.
Fiscus, Jonathan G. et al., "NIST evaluation of conversational speech recognition over the telephone: English and Mandarin performance results", NIST, 2000.
Gales, M. J. F., "Maximum likelihood linear transformations for HMM-based speech recognition", Comp. Speech and Lang., vol. 12, 1997, pp. 75-98.
Graves, Alex et al., "Connectionist temporal classification: Labelling unsegmented sequence data with recurrent neural networks", International Conference on Machine Learning, 2006, pp. 369-376.
Han, K. J. et al., "Deep learningbased telephony speech recognition in the wild", Proc of Interspeech 2017, 2017, pp. 1323-1327.
Han, K. J. et al., "Multi-stride self-attention for speech recognition", Interspeech, 2019, pp. 2788-2792.
Han, K. J. et al., "State-of-the-art speech recognition using multistream self-attention with dilated 1D convolution", ASRU, 2019, pp. 54-61.
Han, K.J. et al., "Capio 2017 conversational speech recognition system", [Online] Available: http://arxiv.org/abs/1801.00059, 2018.
Han, K.J. et al., "Densely connected networks for conversational speech recognition", Interspeech, 2018, pp. 796-800.
Han, K.J. et al., "Multistream CNN for robust acoustic modeling", Interspeech, 2020.
Han, W. et al., "ContextNet: Improving convolutional neural networks for automatic speech recognition with global context", [Online]. Available: http://arxiv.org/abs/2005.03191, 2020.
He, Kaiming et al., "Deep residual learning for image recognition", Conference on Computer Vision and Pattern Recognition, 2016, pp. 770-778.
Hermansky, H., "Multistream recognition of speech: Dealing with unknown unknowns", Proceedings of the IEEE, vol. 101, No. 5, 2013, pp. 1076-1088.
Hermansky, H. et al., "Temporal patterns (TRAPS) in ASR noisy speech", Proc. ICASSP'99, 1999, pp. 289-292.
Hermansky, H. et al., "Towards ASR on partially corrupted speech", ICSLP, 1996, pp. 462-465.
Hinton, Geoffrey E. et al., "Improving neural networks by preventing co-adaptation of feature detectors", 2012, 18 Pages.
Hinton,, G. et al., "Deep neural networks for acoustic modeling in speech recognition", IEEE Signal Process. Mag., vol. 29, No. 6, 2012, pp. 82-97.
Hochreiter, S. et al., "Long short-term memory", Neural Comp., vol. 9, No. 8, pp. 1735-1780, 1997.
Ioffe, Sergey et al., "Batch normalization: Accelerating deep network training by reducing internal covariate shift", International Conference on Machine Learning, 2015, pp. 448-456.
Kahn, J. et al., "Libri-Light: A benchmark for ASR with limited or no uupervision", [Online]. Available: http://arxiv.org/abs/1912.07875, 2019.
Kleinschmidt, M. et al., "Improving word accuracy with Gabor feature extraction", ICSLP, 2002, pp. 25-28.
Koriyama, T. et al., "Utterance-level sequential modeling for deep Gaussian process based speech synthesis using simple recurrent unit", ICASSP, 2020.
Kurata, G. et al., "Language modeling with highway LSTM", Proc of ASRU 2017, 2017.
Lee, Kenton et al., "Recurrent additive networks", CoRR, abs/1705.07393.
Lei, T, et al., "Simple recurrent units for highly parallelizable recurrence", EMNLP, 2018.
Li, K., "Recurrent neural network language model adaptation for conversational speech recognition", Interspeech, 2018, pp. 3373-3377.

(56) References Cited

OTHER PUBLICATIONS

Li, R. et al., "Multi-encoder multi-resolution framework for end-to-end speech recognition", [Online]. Available: https://arxiv.org/abs/1811.04897, 2018.
Li, R. et al., "Multi-stream end-to-end speech recognition", IEEE/ACM Trans. Audio, Speech and Lang. Process., vol. 28, 2020, pp. 646-655.
Liu, L. et al., "On the variance of the adaptive learning rate and beyond", Proceedings of the Eighth International Conference on Learning Representations (ICLR 2020),, Apr. 2020.
Luscher,, C. et al., "RWTH ASR systems for LibriSpeech: Hybrid vs attention", 2019.
Mallidi, S.H. et al., "Autoencoder based multi-stream combination for noise robust speech recognition", Interspeech, 2015, pp. 3551-3555.
Mallidi, S.H. et al., "Novel neural network based fusion for multistream ASR", ICASPP, 2016, pp. 5680-5684.
Mesgarani, N. et al., "A multistream multiresolution framework for phoneme recognition", Interspeech, 2010, pp. 318-321.
Mesgarani, N. et al., "Adaptive stream fusion in multistream recognition of speech", Interspeech, 2011, pp. 2329-2332.
Meyer, B.T. et al., "Optimization and evaluation of Gabor feature sets for ASR", Interspeech, 2008, pp. 906-909.
Mirghafori, N. et al., "Transmissions and transitions: A study of two common assumptions in multi-band ASR", ICASSP, 1998, pp. 713-716.
Misra, H. et al., "New entropy based combination rules in HMM/ANN multi-stream ASR", ICASSP, 2003, pp. 741-744.
Morgan, N. , "Deep and wide: Multiple layers in automatic speech recognition", IEEE Trans. Audio, Speech and Lang. Process., vol. 20, No. 1, 2012, pp. 7-13.
Morris, A. et al., "Multi-stream adaptive evidence combination for noise robust ASR", Speech Communication, vol. 34, No. 1-2, 2001, pp. 25-40.
Okawa, S. et al., "Multi-band speech recognition in noisy environments", ICASSP, 1998, pp. 641-644.
Panayotov, V. et al., "LibrSspeech: An ASR corpus based on public domain audio books", ICASSP, 2015, pp. 5206-5210.
Panayotov, Vassil et al., "LibriSpeech: An ASR corpus based on public domain audio books", International Conference on Acoustics, Speech and Signal Processing, 2015, 5206-5210.
Park, D. S. et al., "SpecAugment: A simple data augmentation method for automatic speech recognition", Interspeech, 2019, pp. 2613-2617.
Park, D.S. , "SpecAugment: A simple data augmentation method for automatic speech recognition", Interspeech, 2019, pp. 2613-2617.
Park, J. et al., "Fully neural network based speech recognition on mobile and embedded devices", NeurIPS, 2018, pp. 10 620-10 630.
Peddinti, Vijayaditya et al., "A time delay neural network architecture for efficient modeling of long temporal contexts", Interspeech, 2015, pp. 3214-3218.
Povey, D. et al., "Purely sequence-trained neural networks for ASR based on lattice-free MMI", Interspeech, 2016, pp. 2751-2755.
Povey, D. et al., "Semi-orthogonal low-rank matrix factorization for deep neural networks", Interspeech, 2018, pp. 3743-3747.
Povey, D. et al., "The Kaldi speech recognition toolkit", Automatic Speech Recognition and Understanding Workshop, 2011.
Povey, D. , "The Kaldi speech recognition toolkit", Automatic Speech Recognition and Understanding Workshop, 2011.
Povey, Daniel et al., "A Time-Restricted Self-Attention Layer for ASR", International Conference on Acoustics, Speech, and Signal Processing, 2018, pp. 5874-5878.
Povey, Daniel et al., "Semi-orthogonal low-rank matrix factorization for deep neural networks", Interspeech, 2018, pp. 3743-3747.
Ravanelli, M. O. Mirco et al., "Realistic multimicrophone data simulation for distant speech recognition", Interspeech, 2016, pp. 2786-2790.
Salazar, Julian et al., "Self-attention networks for connectionist temporal classification in speech recognition", International Conference on Acoustics, Speech, and Signal Process-ing, 2019, 2019.
Saon, G. et al., "English conversational telephone speech recognition by humans and machines", Proc of Interspeech 2017, 2017, pp. 132-136.
Shangguan, Y. , "Optimizing speech recognition for the edge", [Online]. Available: https://arxiv.org/abs/1909.12408, 2019.
Simonyan, S. , "Very deep convolutional networks for large-scale image recognition", [Online]. Available: https://arxiv.org/abs/1409.1556, 2014.
Sperber, Matthias et al., "Self-Attentional Acoustic Models", Interspeech 2018, Hyderabad, India, https://www.isca-speech.org/archive/pdfs/interspeech_2018/sperber18_interspeech.pdf, Sep. 2-6, 2018, pp. 3723-3727.
Stolcke, A. et al., "Explicit word error minimization in n-best list rescoring", Eurospeech, 1997.
Synnaeve, G. et al., "End-to-end ASR: From supervised to semi-supervised learning with modern architectures", [Onlne]. Available: ttps://arxiv.org/abs/1911.08460, 2019.
Tibrewala, S. et al., "Sub-band based recognition of noisy speech", ICASSP, 1997, pp. 1255-1258.
Tjandra, A. et al., "Deja-vu: Double feature presentation and iterated loss in deep Transformer networks", ICASSP, 2020.
Tuske, Z. et al., "Acoustic modeling of speech waveform based on multi-resolution neural network signal processing", ICASSP, 2018, pp. 4859-4863.
Variani, E. et al., "Multi-stream recognition of noisy speech with performance monitoring", Interspeech, 2013, pp. 2978-2981.
Vaswani, A. , "Attention is all you need", Neural Information Processing Systems, 2017, pp. 5998-6008.
Vaswani, A. et al., "Attention is all you need", Neural Information Processing Systems, 2017, pp. 5998-6008.
Vaswani, Ashish et al., "Attention is all you need", 31st Conference on Neural Information Processing Systems (NIPS 2017), Long Beach, CA, USA, 2017, 11 pages.
Waibel, Alexander et al., "Phoneme recognition using time-delay neural networks", IEEE Trans. on Acoustics, Speech, Signal Process., vol. 37, No. 3, Mar. 1989, pp. 328-339.
Wang, X. et al., "Stream attention-based multi-array end-to-end speech recognition", ICASPP, 2019, pp. 7105-7109.
Wang, Y. et al., "Transformer-based acoustic modeling for hybrid speech recognition", ICASPP, 2020.
Xiong, W. et al., "Achieving human parity in conversational speech recognition", [Online]. Available: https://arxiv.org/abs/1610.05256, 2016.
Xiong, W. , "The Microsoft 2017 conversational speech recognition system", MSR-TR-2017-39, 2017.
Xue, Jian et al., "Restructuring of deep neural network acoustic models with singular value decomposition", Interspeech, 2013, pp. 2365-2369.
Yang, Z. et al., "Hierarchical attention networks for document classification", NAACL/NLT, 2016, pp. 1480-1489.
Yang, Zhilin et al., "XLNet: Generalized autoregressive pretraining for language understanding", [Online]. Available: https://arxiv.org/abs/1906.08237, 2019.
Yang, Zhilin et al., "XLNet: Generalized Autoregressive Pretraining for Language Understanding", 33rd Conference on Neural Information Processing Systems (NeurIPS 2019), Vancouver, Canada., arXiv:1906.08237v2 [cs.CL], https://arxiv.org/pdf/1906.08237.pdf, Jan. 2, 2020, 18 pages.
Yu, D. et al., "Deep convolutional neural networks with layer-wise context expansion and attention", Interspeech, 2016, pp. 17-21.
Zeiler, Matthew D. et al., "On rectified linear units for speech processing", International Conference on Acoustics, Speech and Signal Processing, 2013, pp. 3517-3521.
Zhang, Q. et al., "Transformer Transducer: A streamable speech recognition model with transformer encoders and RNN-T loss", ICASSP, 2020, pp. 7829-7833.
Zhao, S.Y. et al., "Multi-stream spectro-temporal features for robust speech recognition", Interspeech, 2008, pp. 898-901.
Zhou, Shiyu et al., "Syllable-based sequence-to-sequence speech recognition with the Transformer in Mandarin Chinese", Interspeech, 2018, pp. 791-795.

\* cited by examiner

MULTISTREAM ACOUSTIC MODELS WITH DILATIONS

CLAIM OF PRIORITY

This patent application claims the benefit of U.S. Patent Application Ser. No. 63/025,640, filed May 15, 2020, and entitled "SYSTEMS AND METHODS FOR MULTISTREAM CNN FOR ROBUST ACOUSTIC MODELING" (ASAP-0031-P01). This patent application claims the benefit of U.S. Patent Application Ser. No. 62/871,033, filed Jul. 5, 2019, and entitled "STATE-OF-THE-ART SPEECH RECOGNITION USING MULTI-STREAM SELF-ATTENTION WITH DILATED 1D CONVOLUTIONS" (ASAP-0023-P01).

The content of the foregoing applications is hereby incorporated by reference in its entirety for all purposes.

BACKGROUND

Acoustic models may be used to process a variety of audio signals such as speech signals. Acoustic models may be used in a variety of applications, such as automatic speech recognition, speaker identification, speaker verification, or signal reconstruction. The performance of an application that processes audio signals may depend on the performance of an underlying acoustic model. Accordingly, accurate acoustic models may improve the quality of such applications.

BRIEF DESCRIPTION OF THE FIGURES

The invention and the following detailed description of certain embodiments thereof may be understood by reference to the following figures.

DETAILED DESCRIPTION

An acoustic model may process an audio signal (or features computed from an audio signal) and provide information about speech units (e.g., phonemes or other linguistic units) that are present in the audio signal and correspond to speech of a person. For example, in some implementations, an acoustic model may output a vector of scores where elements of the vector correspond to speech units and the score indicates a likelihood or probability that a corresponding speech unit is present in a portion of the audio signal. The methods and applications described herein may be implemented using any of the techniques described herein.

Figure 1:
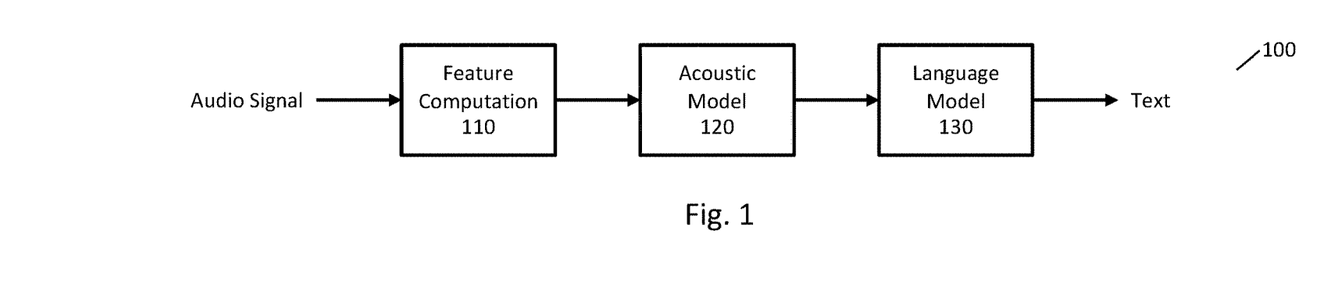
FIG. 1 is an example system for implementing application of processing an audio signal with an acoustic model.

FIG. 1 is an example system 100 for implementing an application of processing an audio signal with an acoustic model. In FIG. 1, the example application is speech recognition, but the techniques described herein are not limited to this application and may be used with any appropriate application. As used herein, an audio signal will refer to a digital audio signal as opposed to an analog audio signal. The process of converting analog signals to digital signals is well known to one of skill in the art.

An audio signal may be represented as a sequence of digital samples, such as samples obtained at a sampling rate of 48 kHz. The audio signal may be processed by feature computation component 110 to produce a sequence of feature vectors that represent the audio signal. Any appropriate feature vectors may be used, such as Mel-frequency cepstral coefficients, linear prediction coefficients, linear prediction cepstral coefficients, line spectral frequencies, discrete wavelet transform coefficients, or perceptual linear prediction coefficients. The rate of the feature vectors may be the same or different from the sampling rate. For example, feature computation component 110 may compute a feature vector for each 10 milliseconds of the audio signal. In some implementations, feature computation component 110 may compute features using unsupervised pretraining, such as using the wav2vec algorithm.

In some implementations, feature computation component 110 may perform additional processing in computing the sequence of feature vectors. For example, feature computation component 110 may process any of the quantities described above with one or more layers of a neural network (such as a convolutional neural network (CNN)). For example, feature computation component 110 may compute features by processing a sequence of Mel-frequency cepstral coefficient vectors with one or more layers of a convolutional neural network.

Acoustic model component 120 may receive the sequence of feature vectors from feature computation component 110 and compute a sequence of speech unit score vectors from the feature vectors. Each speech unit score vector may indicate speech units that are likely present in a portion of the audio signal. The rate of the speech unit score vectors may be the same or different from the rate of the feature vectors.

As used herein, a speech unit represents any appropriate portion of an acoustic aspect of a speech signal. For example, a speech unit may correspond to a linguistic unit (e.g., a phoneme, triphone, quinphone, or syllable) or a portion of a linguistic unit (e.g., a first state of a triphone modelled by a sequence of states). A speech unit may also represent a group or cluster of linguistic units or portions of linguistic units, such as tied states.

Language model component 130 may receive the sequence of speech unit score vectors from acoustic model component 120, determine words that are present in speech of the audio signal, and output text corresponding to speech. Language model component 130 may use any appropriate language model, such as a neural network language model or an n-gram language model. The text may then be used for any appropriate application, such as a transcription application to determine words spoken in the audio signal.

Figure 2:
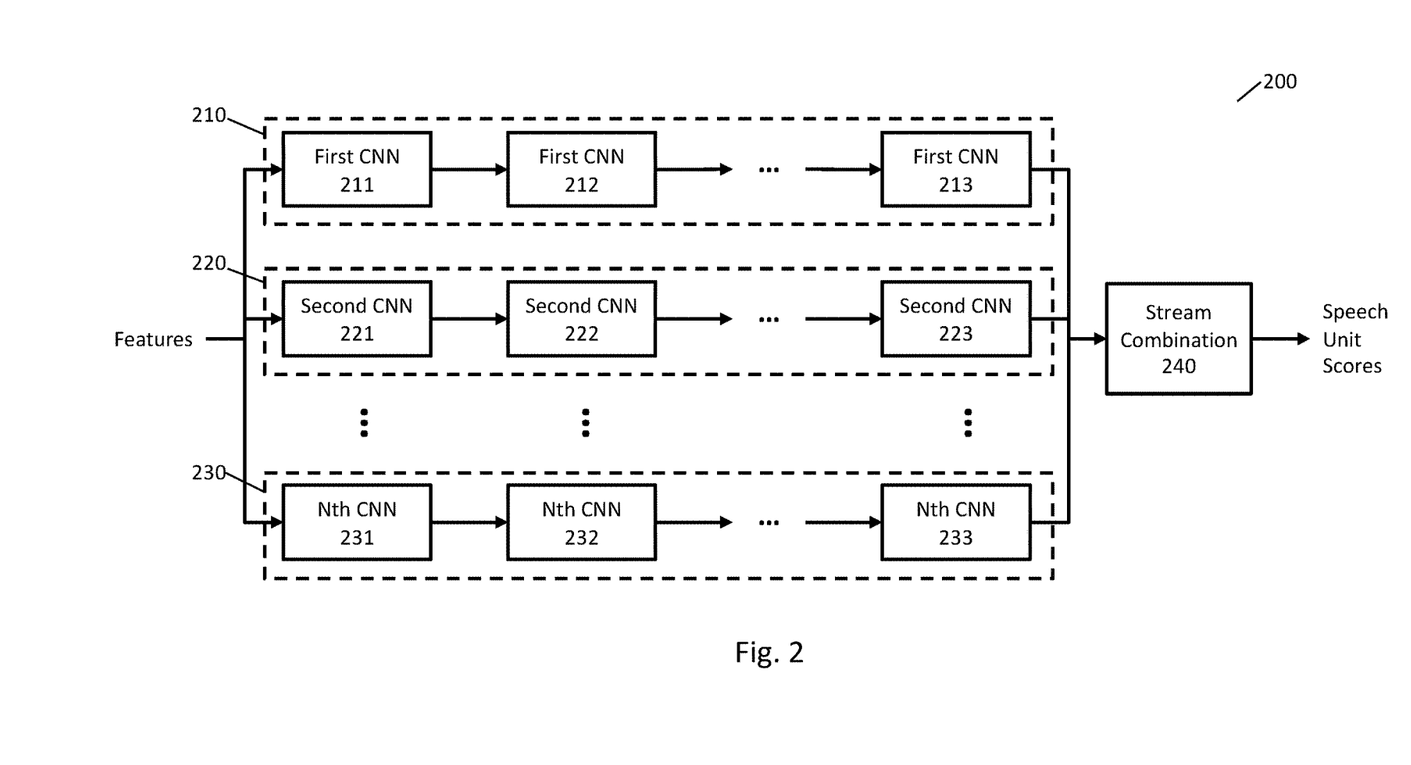
FIG. 2 is an example system for implementing an acoustic model by processing audio features using multiple streams.

FIG. 2 is an example system 200 for implementing an acoustic model by processing audio features using multiple streams.

In FIG. 2, the input to system 200 may be a sequence of feature vectors and the output may be a sequence of speech unit score vectors. The processing may be performed using any number of streams, such as first stream 210, second stream 220, and third stream 230. Each of the streams may process the sequence of feature vectors in parallel with each other. Each stream may process the feature vectors using a different dilation rate. For example, first stream 210 may process the feature vectors with a first dilation rate, second stream 220 may process the feature vectors with a second dilation rate, and third stream 230 may process the feature vectors with a third dilation rate.

In some implementations, the second dilation rate may be different from the first dilation rate, and the third dilation rate may be different from both first dilation rate and the second dilation rate. In some implementations, the dilation rates may be related to each other or to other aspects of the processing. For example, the second and third dilations rates may be multiples of the first dilation rate. For another example, the dilation rates may be multiples of subsampling rates that are used when computing feature vectors.

A stream may use any appropriate techniques to process feature vectors with a corresponding dilation rate. In some implementations, a stream may process the feature vectors with one or more instances of a neural network layer having the corresponding dilation rate. Any appropriate neural network layer may be used, such as a convolutional neural network layer.

In some implementations, each stream may include one or more instances of a convolutional neural network layer having a corresponding dilation rate. For example, first stream 210 may have one or more instances of a first CNN layer with a first dilation rate, such as first CNN layer 211, first CNN layer 212, and first CNN layer 213. Second stream 220 may have one or more instances of a second CNN layer with a second dilation rate, such as second CNN layer 221, second CNN layer 222, and second CNN layer 223. Third stream 230 may have one or more instances of a third CNN layer with a third dilation rate, such as third CNN layer 231, third CNN layer 232, and third CNN layer 233. In some implementations, the dilation rate of each stream may be different from the other streams. For example, the first dilation rate, the second dilation rate, and the third dilation rate may each be different from the others.

The different instances of a CNN layer may have different parameters from each other. For example, first CNN layer 211, first CNN layer 212, and first CNN layer 213 may all have a first dilation rate, but the parameters of each instance of first CNN layer may be different from each other.

Figure 3A:
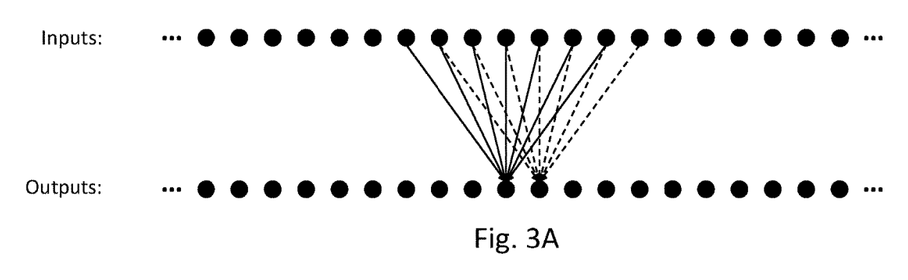
FIGS. 3A-C illustrate processing a sequence of inputs with different dilation rates.
Figure 3B:
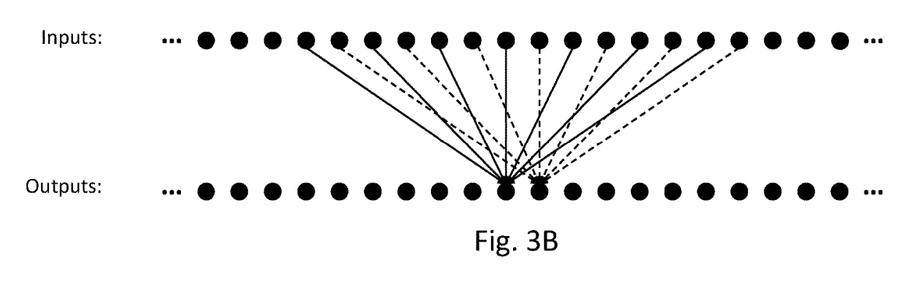
Figure 3C:
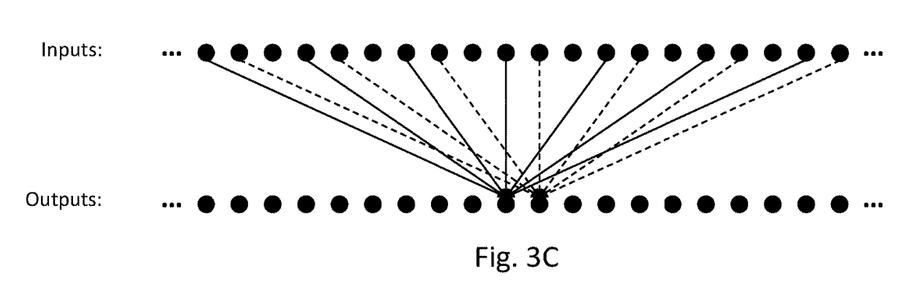

FIGS. 3A-C illustrate processing a sequence of inputs with different dilation rates. In FIGS. 3A-C, the inputs may be the sequence of feature vectors or the output of a previous neural network layer and the outputs are the output of a neural network layer. In the example of FIGS. 3A-C, each output is computed using 7 inputs, but any appropriate number of inputs may be used to compute an output.

In FIG. 3A, the inputs are processed with a dilation rate of 1. Accordingly, 7 consecutive inputs are used to compute an output. The solid lines indicate the 7 inputs used to compute a first output, and the dashed lines indicate the 7 inputs used to compute a second output. Other outputs may be computed in a similar manner. In FIG. 3B, the inputs are processed with a dilation rate of 2. Accordingly, 7 inputs are used to compute an output, but since every other input is used, the span of time corresponding to the inputs is increased. In FIG. 3C, the inputs are processed with a dilation rate of 3. Accordingly, 7 inputs are used to compute an output, but since every third input is used, the span of time corresponding to the inputs is increased even further. Any appropriate dilation rates may be used in addition to or instead of the dilation rates illustrated in FIGS. 3A-C.

The different dilation rates of the streams may improve the performance of the acoustic model. Different aspects of speech may occur over different time frames, and the different dilation rates may allow the processing to better capture information at different time frames. Some aspects of speech may occur over short time frames, such as stop consonants, and smaller dilation rates may allow for improved processing of these aspects. Some aspects of speech may occur over longer time frames, such as diphthongs, and longer dilation rates may allow for improved processing of these aspects. The combination of different dilation rates may thus provide improved performance over acoustic models that don't include multiple streams with different dilation rates in different streams.

Figure 4:
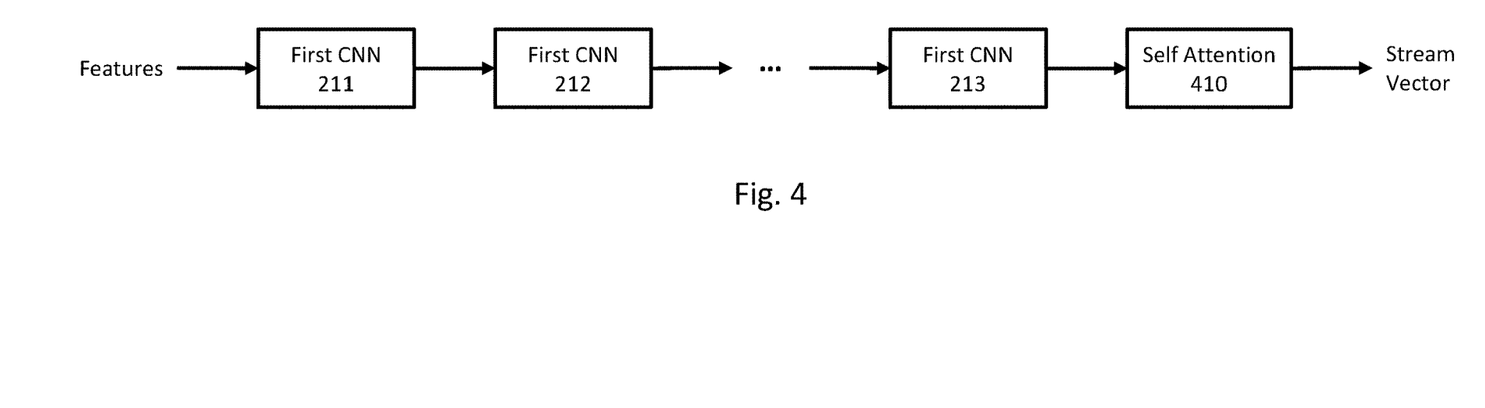
FIG. 4 illustrates an example stream with a self-attention component.

In some implementations, the streams may include other processing in addition to the processing described above. For example, in some implementations, a stream may include processing with a self-attention component. FIG. 4 illustrates an example of a stream that includes a self-attention component. In FIG. 4, the sequence of feature vectors may be processed by one or more convolutional neural network layers, as described above. The output of the final convolutional neural network layer (e.g., first CNN layer 213) may then be processed by self-attention component 410. Self-attention component 410 may perform any appropriate processing such as one or more of the following operations: computing self-attention heads, concatenating self-attention heads, performing layer normalization, processing with a factorized feed forward neural network layer, a skip connection, or dropout.

In some implementations, streams may be implemented using other types of neural networks. For example, a stream may be implemented using a sequence of one or more or a time-delay neural network layer and/or a factorized time-delay neural network layer.

Returning to FIG. 2, stream combination component 240 may process the stream vectors output of the streams to compute a sequence of speech unit score vectors. For example, stream combination component 240 may process a first stream vector computed by first stream 210, a second stream vector computed by second stream 220, and a third stream vector computed by third stream 230. Stream combination component 240 may use any appropriate techniques when processing stream vectors.

In some implementations, stream combination component 240 may perform one or more of the following operations: concatenating the stream vectors; performing batch normalization; or processing with dropout.

The sequence of speech unit score vectors may then be used for any appropriate application of processing audio signals, such as performing speech recognition.

Figure 5:
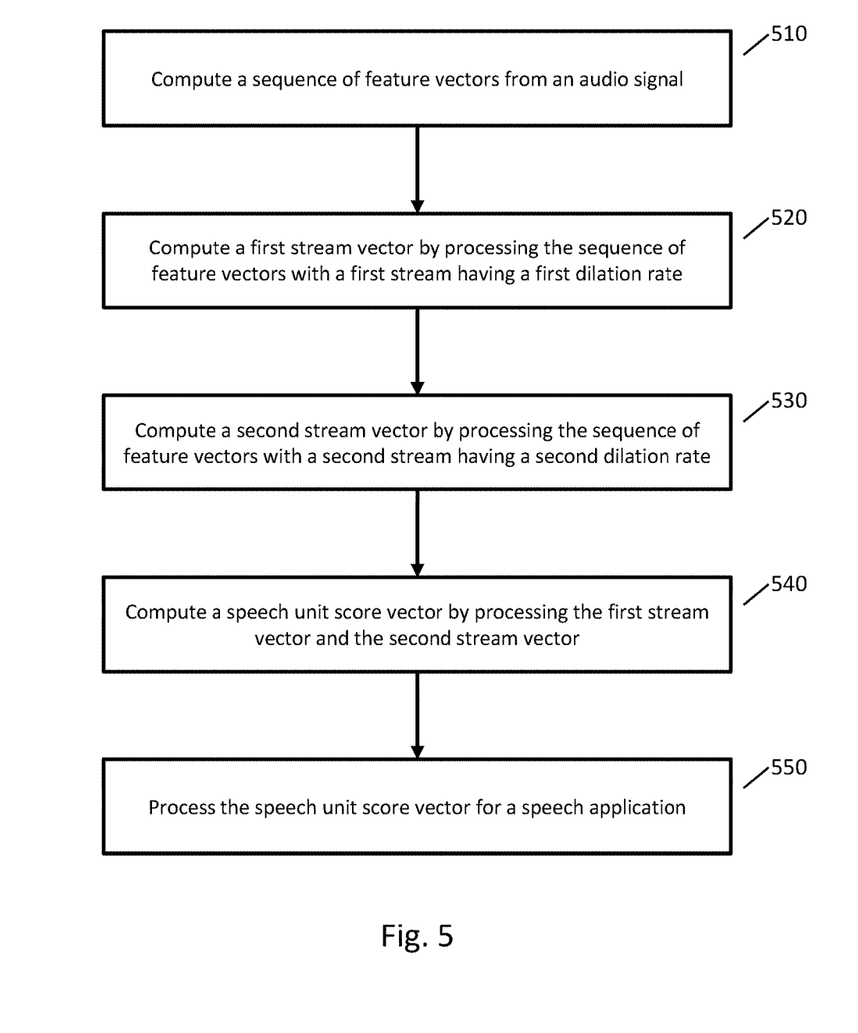
FIG. 5 is a flowchart of an example method for implementing an acoustic model by processing audio features using multiple streams.

FIG. 5 is a flowchart of an example method for implementing an acoustic model by processing audio features using multiple streams.

At step 510, a sequence of feature vectors is computed from an audio signal. Any appropriate techniques may be used, such as any of the techniques described herein. For example, the sequence of feature vectors may be computed by processing a sequence of Mel-frequency cepstral coefficient vectors with one or more convolutional neural network layers.

At step 520, a first stream vector is computed by processing the sequence of feature vectors with a first stream having a first dilation rate. Any appropriate techniques may be used, such as any of the techniques described herein. In some implementations, the first stream may process the sequence of feature vectors with one or more instances of a first convolutional neural network layer having a first dilation rate. In some implementations, the first stream may process the sequence of feature vectors with three or more instances of a first convolutional neural network layer having a first dilation rate. In some implementations, the first stream may include additional processing, such as a self-attention component.

At step 530, a second stream vector is computed by processing the sequence of feature vectors with a second stream having a second dilation rate. In some implementations, the second dilation rate may be different from the first dilation rate. Any appropriate techniques may be used, such as any of the techniques described herein. In some implementations, the second stream may process the sequence of feature vectors with one or more instances of a second convolutional neural network layer having a second dilation rate. In some implementations, the second stream may process the sequence of feature vectors with three or more instances of a second convolutional neural network layer having a second dilation rate. In some implementations, the second stream may include additional processing, such as a self-attention component.

In some implementations, additional stream vectors may be computed, such as a third stream vector or a fourth stream vector. Any appropriate number of stream vectors may be computed. In some implementations, each of the stream vectors may be computed using a different dilation rate.

At step 540, a speech unit score vector is computed by processing the first stream vector and the second stream vector (and optionally other stream vectors). Any appropriate techniques may be used, such as any of the techniques described herein. Each element of the speech unit score vector may indicate a likelihood or probability of a corresponding speech unit being present in a portion of the audio signal.

At step 550, the speech unit score vector is used for a speech application, such as automatic speech recognition. Any appropriate speech application may be used.

In some implementations, step 520 may compute a sequence of first stream vectors, step 530 may compute a sequence of second stream vectors, and step 540 may compute a sequence of speech unit score vectors. The sequence of speech unit score vectors may then be used in a speech application.

The acoustic models described herein may be trained using any appropriate techniques, such as supervised training or unsupervised training. In some implementations, the acoustic models may be trained as part of a speech application (e.g., speech recognition). In some implementations, the acoustic models may be directly trained outside of a speech processing application. In some implementations, the acoustic models may be trained using a labelled corpus of speech training data (e.g., transcribed speech). The training process may include performing a forward pass to compute the output of the acoustic model (or a larger neural network that contains the acoustic model), an error may be computed using a label from the training data, and back propagation may be performed with stochastic gradient descent to update the model parameters. This process may be performed iteratively over a corpus of training data until the model parameters have converged.

Figure 6:
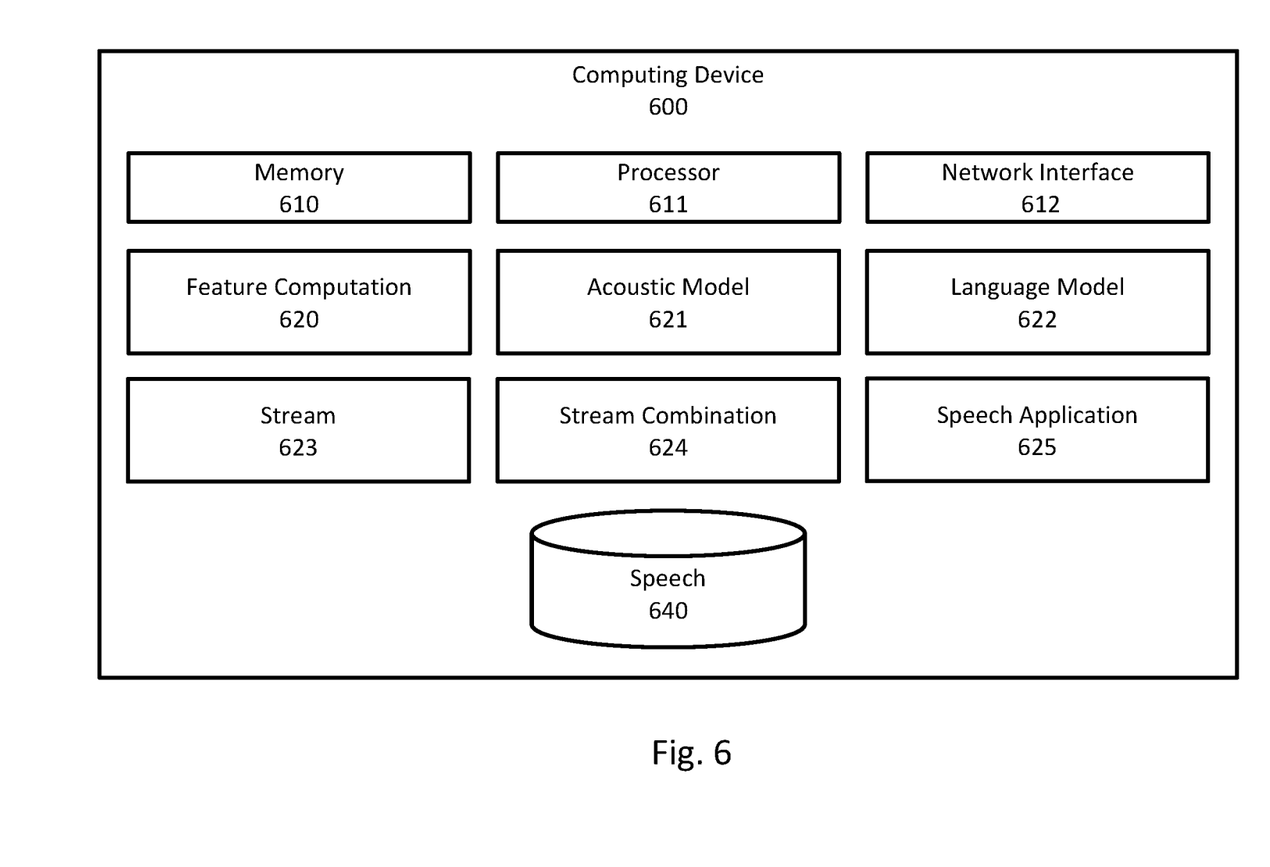
FIG. 6 illustrates components a computing device for implementing an acoustic model by processing audio features using multiple streams.

FIG. 6 illustrates components of one implementation of a computing device 600 for implementing any of the techniques described herein. In FIG. 6, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 600 may include any components typical of a computing device, such as volatile or nonvolatile memory 610, one or more processors 611, and one or more network interfaces 612. Computing device 600 may also include any input and output components, such as displays, keyboards, and touch screens. Computing device 600 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 600 may have a feature computation component 620 that process an audio signal to compute feature vectors using any of the techniques described herein. Computing device 600 may have an acoustic model component 621 that processes feature vectors to compute speech unit scores using any of the techniques described herein. Computing device 600 may have a language model component 622 that processes speech unit scores to determine words in an audio signal using any of the techniques described herein. Computing device 600 may have a stream component 623 that processes feature vectors to compute a stream vector using any of the techniques described herein. Computing device 600 may have a stream combination component 624 that computes a speech unit score vector from stream vectors using any of the techniques described herein. Computing device 600 may have a speech application component 625 that implements a speech application with an acoustic model using any of the techniques described herein.

Computing device 600 may include or have access to various data stores. Data stores may use any known storage technology such as files, relational databases, non-relational databases, or any non-transitory computer-readable media. Computing device 600 may have a speech data store 640 that stores speech data, such as speech data that may be used to train an acoustic model.

Multistream CNN for Robust Acoustic Modeling

Multistream CNN is a neural network architecture for robust acoustic modeling in speech recognition tasks. The proposed architecture accommodates diverse temporal resolutions in multiple streams to achieve the robustness. For the diversity of temporal resolution in embedding processing, consider a dilation on factorized time-delay neural network (TDNN-F), a variant of 1D-CNN. Each stream may stack narrower TDNN-F layers whose kernel has a stream-specific dilation rate when processing input speech frames in parallel. It may better represent acoustic events without the increase of model complexity. The effectiveness of the proposed multistream CNN architecture is validated by showing improvement across various data sets. Trained with the data augmentation methods, multistream CNN improves the word error rate (WER) of the test-other set in the LibriSpeech corpus by 12% (relative). On the custom data from a production system for a call center, it records the relative WER improvement of 11% from the customer channel audios (10% on average for the agent and customer channel recordings) to show the superiority of the proposed model architecture even in the wild. In terms of Real-Time Factor (RTF), multistream CNN outperforms the normal TDNN-F by 15%, which also suggests its practicality on production systems or applications.

Automatic speech recognition (ASR) with processing speech inputs in multiple streams, namely multistream ASR, has been researched mostly for robust speech recognition tasks in noisy environments. The multistream ASR framework was proposed based on the analysis of human perception and decoding of speech, where acoustic signals enter into the cochlea and are broken into multiple frequency bands such that the information in each band can be processed in parallel in the human brain. This approach worked quite well in the form of multi-band ASR where band-limited noises dominate signal corruption. Later, further development was made in regards with multistream ASR in the areas of spectrum modulation and multi-resolution based feature processing and stream fusion or combination.

With the advent of deep learning, another branch of research activities has been stretched out from the framework of multistream ASR, where multiple streams of encoders process embedding vectors in parallel in deep neural network (DNN) architectures. Although some forms of artificial neural networks like multilayer perceptron (MLP) had already been utilized in the literature, they were shallow and their usage was limited to fusing posterior outputs from a classifier in each stream. The recent DNN architectures for multistream ASR instead perform more unified functions, not only processing information in parallel but combining the stream information to classify at once. The multistream architecture may be simplified into one neural network where a binary switch was randomly applied to each feature stream when concatenating the multistream features as the neural network input. In decoding, the tree search algorithm was utilized to find the best stream combination. The stream attention mechanism inspired by the hierarchical attention network was proposed to the multi-encoder neural networks that can accommodate diverse viewpoints when processing embeddings. These multi-encoder architectures were successful in the data sets recorded with multiple microphones. As multihead self-attention became more popular, the multistream self-attention architectures were also investigated to further enhance the diversity of the embedding processes inside the networks by applying unique strides or dilation rates to the neural layers of the streams. The state-of-the-art result was reported on the test clean set of the LibriSpeech corpus using this structure.

The proposed architecture accommodates diverse temporal resolutions in multiple streams to achieve the robustness. For the diversity of temporal resolution in embedding processing, dilation on TDNN-F, a variant of 1D-CNN, is considered. TDNN-F stands for factorized time-delay neural network. The convolution matrix in TDNN-F is decomposed into two factors with the orthonormal constraint, followed by the skip connection, batch normalization and dropout layer in the order. Each stream may stack narrower TDNN-F layers whose kernel has a stream-specific dilation rate when processing input speech frames in parallel. Features of multistream CNN include: it was inspired by the multistream self-attention architecture, but without the multihead self-attention layers; the dilation rate for the TDNN-F layers in each stream is chosen from a multiple of the default subsampling rate (3 frames); it can offer a seamless integration with the training and decoding process where it is applied to sub-sample input speech frames.

With the spectral augmentation (SpecAug) method, multistream CNN can provide more robustness against challenging audio. Its relative WER improvement is 11% on the test-other set in the LibriSpeech corpus.

The LibriSpeech corpus is a collection of approximately 1,000 hr read speech (16 kHz) from the audio books that are part of the LibriVox project. The training data is split into 3 partitions of 100 hrs, 360 hrs, and 500 hrs while the dev and test data are split into the 'clean' and 'other' categories, respectively. Each of the dev and test sets is around 5 hr in audio length. This corpus provides the n-gram language models trained on the 800M token texts.

The Switchboard-1 Release 2 (LDC97S62) and Fisher English Training Part 1 and 2 (LDC2004S13, LDC2004T19, LDC2005S13, LDC2005T19) corpora total 2,000 hrs of 8 kHz telephony speech and are used to train the seed acoustic model and language model, which are further updated with custom telephony data collected from a call center. The seed telephony model evaluation is conducted on the HUB5 eval2000 set (LDC2002S09, LDC2002T43).

Roughly 500 hrs of 8 kHz audio were collected from a call center production ASR system and transcribed. The audio streams from the agent and customer channels are separately recorded. The eval set was made in the same way to the 10 hr audio collection with the balanced distribution of agent and customer channel recordings.

For the Librispeech model training, the default Kaldi recipe was followed. The neural networks for the acoustic model were trained on the total 960 hr training set with the learning rate decay starting from $10^{-3}$ to $10^{-5}$ over the span of 6 epochs. The minibatch size was 64. The n-gram language models provided by the LibriSpeech corpus were used for the 1st pass decoding and rescoring, and a neural network language model for further rescoring was not applied.

Regarding the telephony seed model training, the Kaldi recipe was also used. The models were trained with the 2,000 hr training data. For the neural network acoustic models, the learning rate was exponentially decayed from $10^{-3}$ until $10^{-4}$ during 6 epochs. The minibatch size was 128. The default language models produced by the recipe were used for the seed model evaluation.

To fine-tune the seed telephony models with the ASAPP custom data, the learning rate decay was adjusted ranging from $10^{-1}$ until $10^{-7}$ for 6 epochs with the same minibatch size. The PocoLM tool was used to train the 4-gram language model for the 1st-pass decoding in the evaluation.

The proposed multistream CNN architecture branches multiple streams out of given input speech frames after going through a few initial CNN layers in a single stream where CNNs could be TDNN-F or 2D CNN (in a case of applying the SpecAug layer). After being branched out, the stacked TDNN-F layers in each stream may process the output of the single stream CNNs with a dilation rate. Consider the embedding vector $x_i$ comes out of the single stream CNN layers at the given time step of i. The output vector $y_i^m$ from the stream m going through the stack of TDNN-F layers with the dilation rate $r_m$ can be written as:

$$y_i^m = \text{Stacked-TDNN-}F_m(x_i|[-r_m, r_m])$$

where $[-r_m, r_m]$ means the 3×1 kernel given the dilation rate of $r_m$. The output embeddings from the multiple streams may then be concatenated and followed by the batch normalization and dropout layer:

$$z_i = \text{Dropout}[\text{BatchNorm}\{\text{Concat}(y_i^1, y_i^2, \ldots, y_i^M)\}]$$

which is projected to the output layer via a couple of fully connected layers at the end of the network.

In the subsequent subsections, the effect of our design choices in the proposed multistream CNN architecture in terms of WER on the LibriSpeech dev and test sets was analyzed. Neural network language models for rescoring was not considered and the original n-gram language models provided by the LibriSpeech corpus was used. Unless specified, the complexity of the models compared is in the similar range of 20M parameters for fair comparison. The baseline is based on the 17-layer TDNN-F model in the recipe for LibriSpeech of the Kaldi toolkit (egs/librispeech/s5/local/chain/runtdnn.sh).

The 5 layers of TDNN-F were positioned in a single stream to process input MFCC features before splitting to multiple streams. In each stream, after being branched out from the single stream TDNN-F layers, a ReLu, batch normalization and dropout layer are rolled out and then 17 TDNN-F layers are stacked, totaling the layer number of the entire network to 23. To constrain the model complexity of around 20M parameters, the more streams are considered, the smaller embedding size is used correspondingly.

The multistream CNNs were compared against the baseline model as the number of streams was increased with incrementing the dilation rate by 1. For example, 1-2-3-4-5 indicates that the dilation rates of 1, 2, 3, 4, and 5 are applied to the respective streams over the total 5 streams in the multistream CNN model. As noted, the dimension of embedding vectors for TDNN-F was adjusted to constrain the model complexity to the range of 20M parameters. With the similar model complexity, the proposed multistream CNN architecture is shown to improve the WERs of the "other" data sets more noticeably as the number of streams was increased to 9.

The careful selection of dilation rates was shown to achieve lower WERs across evaluation sets even with smaller numbers of streams. The multiples of the default subsampling rate (3 frames) was chosen as dilation rates in order to make the selection better streamlined with the training and decoding process where input speech frames are subsampled.

Juxtaposing the baseline WERs and the counter performances by the multistream CNN models with the sets of dilation rates chosen from the multiples of the subsampling rate over 3 streams, the 6-9-12 configuration was observed to present the relative WER improvements of 3.8% and 5.7% on the testclean and test-other set, respectively. Considering the overall degradation by the multistream CNN model with the 1-2-3 configuration over the same number of streams, the suggested selection policy of dilation rates is a factor for the proposed model architecture to perform properly.

The diversity of streams in terms of temporal resolution seems another factor for the multistream CNN architecture to achieve the expected performance. Comparing the WERs by the models with the 1-3-6-9-12-15 and $(1-3-6)^2$ configuration, which is the same with 1-3-6-1-3-6, the model with the unique dilation rate in each stream is shown to be superior to the model with the overlapped temporal resolutions in the streams. The similar observation can be made by considering the WERs of the model with the 1-2-3-4-5-6-7-8-9 configuration and those with the configurations of $(1-3-6)^3$, $(3-6-9)^3$ and $(6-9-12)^3$, all of which have the multistream architecture with the total 9 streams. Without the stream diversity in terms of temporal resolution, it is shown that the models configured with the multiples of the subsampling rate for the dilation rates of TDNN-F would not outperform the models configured not that way.

Since its introduction, the SpecAug data augmentation method of masking some random bands from input speech spectra in both frequency and time has been adopted by both hybrid and end-to-end ASR systems, in order to prevent the neural network model training from being overfit, thus enabling the trained model to become more robust to unseen testing data. To apply this method on top of the proposed multistream CNN architecture, the 5 layers of TDNN-F in the single stream are replaced with the 5 layers of 2D-CNNs to accommodate log-mel spectra as the input of the model rather than MFCCs. For the 2D CNN layers, 3×3 kernels are used with the filter size of 256 except for the first layer with the filter size of 128. Every other layer applies frequency band subsampling with the rate of 2.

The WERs between the original multistream CNN model with the 6-9-12 configuration and the equally configured model with the SpecAug layer are compared. Not much difference is seen overall between TDNN-F and 2D-CNN in the single stream part of the proposed architecture (i.e., 1st and 2nd row of the multistream CNN section in the table). It is apparent that the SpecAug layer can enhance the robustness of the multistream CNN model in the tough acoustic conditions of the "other" sets. The relative WER improvement of 11.8% on the test-other set against the baseline performance demonstrates the superiority of the proposed multistream CNN architecture.

The feasibility of the proposed architecture in real-world scenarios is now considered. Custom training data (500 hrs) from a call center client is used to update the seed models that were trained on the SWBD/Fisher corpora mentioned above. The seed model performances on the HUB5 eval2000 set consisting of SWBD and CH (i.e., CallHome) exhibit the mixed results where for SWBD the baseline model performs better while the multistream CNN model appears to outmatch in CH. A noteworthy observation is that the proposed model architecture continues to excel in the challenging data set. This is further highlighted where the two models (baseline and multistream CNN) are evaluated on the custom eval set of 10 hrs described above after being fine-tuned with the aforementioned custom training set. The relative WER improvement of 11.4% on the customer channel recordings declares the robustness of the multistream CNN architecture in the wild. The customer channel audio are by far challenging for ASR systems due to various contributing factors including noisier acoustic environments, non-native & accented speech, multiple talkers, etc. In addition, the relative RTF improvement of 15.1% as compared to the baseline TDNN-F model shows the practicality of the proposed model architecture in real-world applications, especially where online inference is critical.

The novel neural network architecture of multistream CNN for robust speech recognition are proposed. To validate the proposed idea, ablation evaluations were conducted for the design choices of the model architecture. Also, the multistream CNN models were tested against various data sets including custom data collected from the call center domain to demonstrate the strength of the models in both robustness to challenging acoustics and RTF. Trained with the SpecAug method, multistream CNN improved the WER of the test-other set in the LibriSpeech corpus by 12% (relative). On the custom data, it achieved relative WER improvement of 11% from the customer channel audios. Multistream CNN also outperformed the baseline TDNN-F model in the custom data evaluation by 15% (relative) in terms of RTF. All the results suggest the superiority of the proposed model architecture. Given its robustness and feasibility, multistream CNN is promising in a number of ASR applications and frameworks.

State-of-the-Art Speech Recognition Using Multi-Stream Self-Attention with Dilated 1D Convolutions Self-attention has been a huge success for many downstream tasks in natural language processing (NLP), which led to exploration of applying self-attention to speech problems as well. The efficacy of self-attention in speech applications, however, seems not fully known since it is challenging to handle highly correlated speech frames in the context of self-attention. A new neural network model architecture is proposed, namely multi-stream self-attention, to address the issue thus make the self-attention mechanism more effective for speech recognition. The proposed model architecture consists of parallel streams of self-attention encoders, and each stream has layers of 1D convolutions with dilated kernels whose dilation rates may be different, followed by a self-attention layer. The self-attention mechanism in each stream pays attention to only one resolution of input speech frames and the attentive computation can be more efficient. In a later stage, outputs from all the streams are concatenated then linearly projected to the final embedding. By stacking the proposed multi-stream self-attention encoder blocks and rescoring the resultant lattices with neural network language models, the word error rate of 2.2% is achieved on the test-clean dataset of the LibriSpeech corpus, the best number reported thus far on the dataset.

Self-attention is the core component of the neural network architectures recently proposed in NLP to achieve the state-of-the art performances in a number of downstream tasks. Transformer successfully replaced recurrent neural networks such as LSTMs with sinusoidal positional encoding and the self-attention mechanism to be context-aware on input word embeddings. BERT took the benefit from the success of Transformer to extend it to the autoencoding based pretraining model, which can be fine-tuned to reach the state-of-the-art performances for various downstream tasks. XLNet, as the very latest state-of-the-art pretraining model, outperformed BERT in a number of downstream tasks from question answering to document ranking, thanks to model training with targets being aware and relative positional encoding like its ancestor of Transformer-XL.

With the huge success in NLP, self-attention has been actively investigated for speech recognition as well. Time-restricted self-attention has been introduced with a one-hot vector representation being exploited as relative positional encoding for given restricted contexts of speech frames. The well-known Listen, Attend and Spell (LAS) ASR model has employed the multi-head approach to the attention mechanism to further improve its already state-of-the-art accuracy on the large-scale voice search data. Several approaches have been explored for better application of self-attention to speech recognition in the LAS framework, e.g., speech frame handling strategies or attention biasing to restrict the locality of the self-attention mechanism. The CTC loss have been applied to optimize the Transformer encoder structure for ASR. The entire encoder-decoder structure of the original Transformer has been examined in the context of Mandarin Chinese speech recognition tasks.

The challenge in terms of applying self-attention to speech recognition is that individual speech frames are not like lexical units such as words. Speech frames do not convey distinct meanings or perform unique functions, which makes it hard for the self-attention mechanism to compute proper attentive weights on speech frames. Considering that adjacent speech frames could form a chunk to represent more meaningful units like phonemes, some sort of pre-processing mechanisms such as convolutions to capture an embedding for a group of nearby speech frames would be helpful for self-attention. In addition, a multi-resolution approach could be beneficial as well since boundaries for such meaningful chunks of speech frames are dependent of many factors, e.g., the type of phonemes (vowel vs. consonant) and the way they are pronounced, affected by gender, speaker, co-articulation and so on. Based on this reasoning, a new neural network model architecture is proposed for better self-attention, namely multi-stream self-attention. The proposed architecture consists of parallel streams of self-attention. In each stream, input speech frames are processed with a distinct resolution by multiple layers of 1D convolutions with a unique dilation rate, and the convoluted embeddings are fed to a subsequent multi-head self-attention layer. In a later stage, the attentive embeddings from all the streams are concatenated then linearly projected to the final embedding. State-of-the-art performance is achieved on the LibriSpeech corpus by stacking up these multi-stream self-attention blocks and rescoring the resultant lattices with powerful neural language models. WERs were obtained on the dev-clean and test-clean sets of 1.8% and 2.2%, respectively, and appear to be the best reported numbers thus far on the datasets.

The proposed multi-stream self-attention block, where each stream may consist of multiple layers of 1D convolutions, one layer of multi-head self-attention, and a feed forward layer sandwiched by two layer normalizations. Each layer normalization may have a skip connection with the input of its previous layer. The embeddings from all the streams are projected to the final embedding in a later stage. Each component of the multi-stream self-attention architecture is now described.

Time delay neural networks (TDNNs) have been one of the most popular neural network models for speech recognition. It was introduced to capture the long range temporal dependencies of acoustic events in speech signals by exploiting a modular and incremental design from subcomponents. The modified version was recently proposed for better efficiency using the layer-wise subsampling methods.

A TDNN is basically a 1D convolution. This convolution layer and its kernels with various dilation rates are used to control the resolution of input speech frames being processed in the parallel streams. In each stream, layers of 1D convolutions with a dilation rate process speech frames in the specified resolution. This can reduce burden on the self-attention mechanism to enable the attentive computation to focus on only one resolution of speech frames in the given stream. Examples of the 1D convolutions which the 3×1 kernels may include dilation rates of 1, 2, and 3.

In order to make the convolution layers more efficient, the factorized TDNN may be used. Singular Value Decomposition (SVD) may be used to factorize a learned weight matrix into two low-rank factors and reduce the model complexity of neural networks. The factorized TDNN or factorized 1D convolution (1D Conv-F) layers also utilizes SVD to factorize a 1D convolution parameter matrix into two low-rank matrices. The kernel for each factorized 1D convolution is set to 2×1. One of the two factorized convolutions is constrained by the semi-orthogonal condition during training. Consider U as one of the factors in the original parameter matrix W after SVD. The semi-orthogonal constraint puts the condition to minimize a function $f$:

$$f = \text{Trace}(QQ^T)$$

where $Q = P - I$. P is defined by $UU^T$ and I is the identity matrix. This way of factorization with the semi-orthogonal constraint leads to less model complexity overall and also results in better modeling power. After the factorization, the rectified linear unit (ReLu), batch normalization, and dropout are followed by a skip connection between the scaled input embedding and the output of the dropout layer. The scale value is a hyper-parameter.

In a given stream of s, the time-restricted self-attention mechanism may be formulated in a mathematical manner as follows. An input embedding matrix to the stream s, may be defined as $X^s \in R^{N \times d_{model}}$, where N is the total number of input embeddings restricted by the left and right context and $d_{model}$ is the dimension of embeddings used inside the self-attention mechanism. Note downsampling is applied to the input that embeddings and the sampling rate is matched to the specified dilation rate ($r_s$) of the 1D Conv-F layers in the stream. For the projected query, key and value matrices, $Q^s_i$, $K^s_i$ and $V^s_i$ in the stream s, the output for the $i^{th}$ head is computed as follows:

$$Head^s_i = Softmax\left(\frac{Q^s_i K^{sT}_i}{\sqrt{d_k}}\right)V^s_i$$

where $Q^s_i = X^s W^{s,Q}_i$, $W^{s,Q}_i \in \mathbb{R}^{d_{model} \times d_q}$, $K^s_i = X^s W^{s,K}_i \in \mathbb{R}^{d_{model} \times d_k}$, $V^s_i = X^s W^{s,V}_i$, $W^{s,V}_i \in \mathbb{R}^{d_{model} \times d_v}$, and $d_q$, $d_k$, and $d_v$ are the dimensions of query, key and value embeddings, respectively. The multihead outputs are concatenated and linearly projected, then layer normalization is applied to the projected embedding that is skip-connected with the input embedding:

MultiHeadProj$^s$=Concat(Head$_1^s$, ... ,Head$_{n_h}^s$)$W^{s,O}$

MidLayer$^s$=LayerNorm(MultiHeadProj$^s$+$X^s$)

where $n^s_h$ is the number of heads in the stream s and $W^{s,O}_i \in R(nh \times dv) \times dmodel$. The value nsh=nh/S, given nh is a fixed value for the total number of multi-heads across the self-attention components of the whole streams.

The multiple streams in the proposed architecture could increase the model complexity significantly as opposed to a single stream approach. To retain the model complexity to a reasonable level as well as avoid the loss of modeling power, the factorized feed forward networks with a bottleneck layer in between given stream may be used. The semi-orthogonal constraint discussed above is also applied here to one of the factorized matrices during training. After the skip connection, the encoder output in the stream s can be written as below:

Factorized$^s$=Factorized-FF(MidLayer$^s$)

Encoder$^s$=LayerNorm(Factorized$^s$+MidLayer$^s$)

Note that the dimension $d_{ff}$ of the embedding layer between the feed forward networks of the original Transformer encoder is either 1,024 or 2,048. The model complexity of the feed forward component may be reduced by the factor of 8 or 16 if the choice of the bottleneck layer in the factorized version was 128.

The final embedding layer concatenates the encoder output from each stream and linearly projects the concatenated vector to the final embedding. The ReLu non-linear activation, batch normalization, and dropout follows before feeding out the final embedding as the output:

MultiEncProj=Concat(Encoder$^1$, ... ,Encoder$^s$)$W^O$

Final=Dropout(BatchNorm(ReLu(MultiEncProj)))

where $WO \in R(S \times d^{model}) \times dmodel$.

For the experiments, the LibriSpeech corpus is used as the main training and testing datasets. The LibriSpeech corpus is a collection of approximately 1,000 hr audiobooks that are a part of the LibriVox project. Most of the audiobooks come from the Project Gutenberg. The training data is split into 3 partitions of 100 hr, 360 hr, and 500 hr sets while the dev and test data are split into the 'clean' and 'other' categories, respectively, depending upon how well or challenging ASR systems would perform against. Each of the dev and test sets is around 5 hr in audio length. This corpus also provides the n-gram language models and the corresponding texts excerpted from the Project Gutenberg books, which contain 803M tokens and 977K unique words.

To prepare a lexicon, 522K words were selected among the 977K unique words that occur more than once in the LibriSpeech texts. Using the base lexicon of the CMUdict that covered 81K among the selected words of 522K, G2P model was trained using the Sequitur tool to cover the out-of-vocabulary words. The SRILM toolkit was used to train n-gram language models (LMs). The 4-gram LM was trained initially on the entire texts available with the modified KneserNey smoothing, then pruned to the 3-gram LM. The first-pass decoding was conducted with the 3-gram LM and the resultant lattices were rescored with the 4-gram LM later in the second-pass. The lattices were further rescored with the neural network LMs of three TDNN layers and two LSTM layers being interleaved that were trained by the Kaldi toolkit.

The Kaldi toolkit was used for the acoustic modeling as well, mostly following the LibriSpeech recipe up to the stage of Speaker Adpative Training (SAT). The training data size was gradually increased from 100 hrs to 960 hrs over the course of the GMM training stages, while the neural network training used the entire 960 hr data. The GMMs were first trained within the framework of 3-state Hidden Markov Models (HMMs). The conventional 39-dimensional MFCC features were spliced over 9 frames and LDA was applied to project the spliced features onto a 40-dimensional subspace. Further projection was conducted through MLLT for better orthogonality. SAT was applied with feature-space MLLR (fMLLR) to further refine mixture parameters in GMMs. For the neural network acoustic models, the 40-dimensional higher-resolution MFCCs were appended with 100-dimensional i-vectors and trained the models having the lattice alignments given by the SAT-ed GMMs as soft targets. The LF-MMI objective was used to optimized the parameters with the three regularization methods of cross-entropy, L2 and leaky HMM. The exponential decrease of learning rates from $10^{-3}$ to $10^{-5}$ was applied to make the entire training procedure stable and have better convergence. The number of nodes in the final layer was determined by the number of tri-phone states in the HMM, which is 6K after the phonetic tree clustering. The trainings were conducted on the Nvidia V100 servers with 8 GPUs.

The dimensions of query, key, and value embeddings in self-attention are set to $d_q=d_k=40$, and $d_v=80$, and $d_{model}=256$. The bottleneck dimension for the factorized convolutions and the factorized feed-forwards is 128. The number of streams and the number of the 1D convolution layers in each stream is from 1 to 5 and 0 to 7, respectively, depending on the experiment type for the ablation tests.

For the test of the validity of multiple streams in the proposed architecture, the number of multi-heads was controlled in the self-attention layer in each stream such that $n^s_h=n_h/S$ while fixing $n_h=15$. For example, if the number of streams is 3 (i.e., S=3), then the number of multi-heads in the self-attention layer of each stream would be 15/3=5, thus $n^1_h = n^2_h = n^3_h = 5$. This is to rule out the possibility that any performance improvement would come from the significant increase of model complexity.

The effect of having multiple streams in the proposed architecture is shown. The three entries for the system configurations correspond to S=1,3 and 5, respectively, while fixing the dilation rate of 1 across the streams. (For example, 1-1-1 means the three streams with the fixed dilation rate of 1 for the factorized convolutions of all the streams.) It is noticeable that with more streams, better accuracy was obtained, but without a diverse selection of dilation rates across the streams, the improvement would be limited.

The effect of having diverse dilation rates across the multiple streams of the proposed architecture is shown. The various dilation rates across the streams are shown to help improve WERs by the clear margins. However, just mixing any values would not guarantee the performance improvement. For example, the system configuration of 1-3-5 presents the WER on the dev-other set worse than the configuration of 1-1-1 does. It seems that a careful mix of the dilation rates would be critical for the proposed model. The best configuration was from the 1-2-3-4-5 setup, which has the 5 different dilation rates (by the difference of 1) for the 1D convolutions across the streams, marking 7.69% and 6.75% WERR on dev-clean and dev-other, respectively, as compared to the single stream baseline. This validates the efficacy of the proposed multi-stream strategy of having 1D convolutions with a unique dilation rate in each stream. The proposed architecture seemingly helps the self-attention mechanism better process embeddings in each stream and lead to more accurate results overall.

The main purpose of having the factorized feed-forward networks in the proposed architecture is to retain the model complexity within a reasonable boundary even with adding more streams. The proposed multi-stream model architecture, otherwise, would increase the model complexity very easily as more streams are added. With the same configuration of 1-2-3-4-5, it is shown that the factorization works as expected. The factorized feed-forward networks not only contribute to the model complexity under 10M parameters but also keep the performance in a similar level with the control group that includes the normal (i.e., without factorization) feed-forward networks with the wider bottleneck layer of 1,024- or 2,048-dimension.

The effect of having the 1D convolutions in the proposed multi-stream self-attention model architecture is shown. It presents the importance of the 1D convolutions preceding the self-attention mechanism in the multi-stream framework. The 7-layer Conv-F leads to roughly 15% and 20% WERR for the dev-clean and dev-other dataset, respectively, against the case of having no convolutions. The pattern seems that the more convolution layers, the more performance gain would be obtained, but after the 7 layers any significant performance boost was not observed.

The model for the LibriSpeech speech recognition task is configured by stacking the proposed multi-stream self-attention blocks. The chosen configuration of the ASR system for us is 3 layers of multi-stream self-attention blocks, 5 streams of self-attention encoders in each block, 7 layers of 1D Conv-F's in each stream, and dilation configuration of 1-2-3-4-5 to 1D CONVF's across streams.

The total number of parameters for this setup is 23M. The lattice-rescored result of this system with the 4-gram LM is presented.

As for the neural network language models, the models of 3 TDNN layers and 2 LSTM layers (unidirectional) were trained being interleaved. The averaged (relative) error rate reduction by the best neural network language model (with the dimension of 4,096) against the 4-gram LM case ranges from 15% to 20%. The embedding dimension seems to matter in terms of performance improvement. Dimensions bigger than 4,096 were not tried due to the prohibitive model training time. The best model in terms of WER improvement is the one with the 4-layered LSTMs, trained with around 10K word pieces.

The hybrid DNN/HMM approach was used for the different neural network acoustic models of CNN-biLSTM, pyramidal Feedforward Sequential Memory Network (FSMN), and BiLSTM, respectively, in. The Transformer LM was exploited as the best rescoring LM in. In the end-to-end framework was considered. Time Depth Separable (TDS) convolutions were introduced in while the cut out of spectrograms was applied on the fly during training to enhance the noise robustness. In, the full Transformer model was studied comparatively in various speech tasks. As compared to the other state-of-the-art system performances, it is shown that the best performances on both of the dev-clean and test-clean set were achieved, while on the dev-other and test-other set the lowest WERs are presented in. The WERs of 1.8% and 2.2% on the datasets by the proposed system are the best numbers thus far reported in the literature.

The multi-stream self-attention model architecture preceded by the layers of the factorized 1D convolutions with the unique dilation rate in each stream is proposed. This architecture allows input speech frames to be efficiently processed and effectively self-attended. The proposed ideas were validated by performing the ablation tests, and also configured the state-of-the-art ASR system by stacking the multistream self-attention model blocks with the strong neural network language models. The WERs on the dev-clean and test-clean set of 1.8% and 2.2% are the best reported numbers found in the literature.

Note that the proposed system has only 23M parameters. The other systems have higher model complexity, for example, 100M for CNN-biLSTM or 200M for LAS. This could make our system more practical and appealing to speech engineers or practitioners who would like to deploy ASR models as a service on devices with the limited computing power. Of course, the practicality of the proposed model on on-device ASR would rely upon the usage of much lighter LM models.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a computer-implemented method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference in the entirety.

What is claimed is:

1. A computer-implemented method for processing speech, comprising:
   receiving a sequence of feature vectors computed from an audio signal;
   computing a first stream vector by processing the sequence of feature vectors in a first stream, wherein the first stream comprises a first convolutional neural network layer having a first dilation rate;
   computing a second stream vector by processing the sequence of feature vectors in a second stream, wherein the second stream comprises a second convolutional neural network layer having a second dilation rate, wherein the second stream does not include a layer with the first dilation rate, and wherein the second stream processes the sequence of feature vectors in parallel with the first stream; and
   computing a vector of speech unit scores by processing the first stream vector and the second stream vector.

2. The computer-implemented method of claim 1, comprising processing the vector of speech unit scores to determine one or more words spoken in the audio signal.

3. The computer-implemented method of claim 1, wherein the sequence of feature vectors comprise a sequence of vectors of Mel-frequency cepstral coefficients.

4. The computer-implemented method of claim 1, wherein the sequence of feature vectors is computed by processing a second sequence of feature vectors with one or more neural network layers.

5. The computer-implemented method of claim 1, comprising:
computing a third stream vector by processing the sequence of feature vectors in a third stream, wherein the third stream comprises a third convolutional neural network layer having a third dilation rate, wherein the third dilation rate is different from the first dilation rate and is different from the second dilation rate; and
wherein computing the vector of speech unit scores comprises processing the third stream vector.

6. The computer-implemented method of claim 1, wherein the first stream comprises a sequence of three or more convolutional neural network layers each having the first dilation rate.

7. The computer-implemented method of claim 1, wherein the first convolutional neural network layer comprises a time-delay neural network layer.

8. The computer-implemented method of claim 1, wherein the first convolutional neural network layer comprises a factorized time-delay neural network layer.

9. A system, comprising:
at least one server computer comprising at least one processor and at least one memory, the at least one server computer configured to:
receive a sequence of feature vectors computed from an audio signal;
compute a first stream vector by processing the sequence of feature vectors in a first stream, wherein the first stream comprises a first convolutional neural network layer having a first dilation rate;
compute a second stream vector by processing the sequence of feature vectors in a second stream, wherein the second stream comprises a second convolutional neural network layer having a second dilation rate, wherein the second stream does not include a layer with the first dilation rate, and wherein the second stream processes the sequence of feature vectors in parallel with the first stream; and
compute a vector of speech unit scores by processing the first stream vector and the second stream vector.

10. The system of claim 9, wherein the at least one server computer is configured to process the vector of speech unit scores to determine one or more words spoken in the audio signal.

11. The system of claim 9, wherein the at least one server computer is configured to compute the vector of speech unit scores by concatenating two or more stream vectors, the two or more stream vectors comprising the first stream vector and the second stream vector.

12. The system of claim 9, wherein the at least one server computer is configured to compute the vector of speech unit scores using batch normalization.

13. The system of claim 9, wherein the second dilation rate is a multiple of the first dilation rate.

14. The system of claim 9, wherein the first dilation rate is a multiple of a sub sampling rate corresponding to the sequence of feature vectors.

15. The system of claim 9, wherein the first stream comprises a sequence of three or more convolutional neural network layers each having the first dilation rate.

16. One or more non-transitory, computer-readable media comprising computer-executable instructions that, when executed, cause at least one processor to perform actions comprising:
receiving a sequence of feature vectors computed from an audio signal;
computing a first stream vector by processing the sequence of feature vectors in a first stream, wherein the first stream comprises a first convolutional neural network layer having a first dilation rate;
computing a second stream vector by processing the sequence of feature vectors in a second stream, wherein the second stream comprises a second convolutional neural network layer having a second dilation rate, wherein the second stream does not include a layer with the first dilation rate, and wherein the second stream processes the sequence of feature vectors in parallel with the first stream; and
computing a vector of speech unit scores by processing the first stream vector and the second stream vector.

17. The one or more non-transitory, computer-readable media of claim 16, wherein the actions comprise processing the vector of speech unit scores to determine one or more words spoken in the audio signal.

18. The one or more non-transitory, computer-readable media of claim 16, wherein the first stream comprises a self-attention layer.

19. The one or more non-transitory, computer-readable media of claim 18, wherein the self-attention layer comprises a factorized feed forward layer.

20. The one or more non-transitory, computer-readable media of claim 18, wherein the self-attention layer a skip connection.

* * * * *